April 12, 1966   J. E. DAVIS   3,245,304
PHOTOMETRIC ANALYZER
Filed Aug. 14, 1961   2 Sheets-Sheet 1

INVENTOR.
JOHN E. DAVIS
BY
Flam and Flam
ATTORNEYS

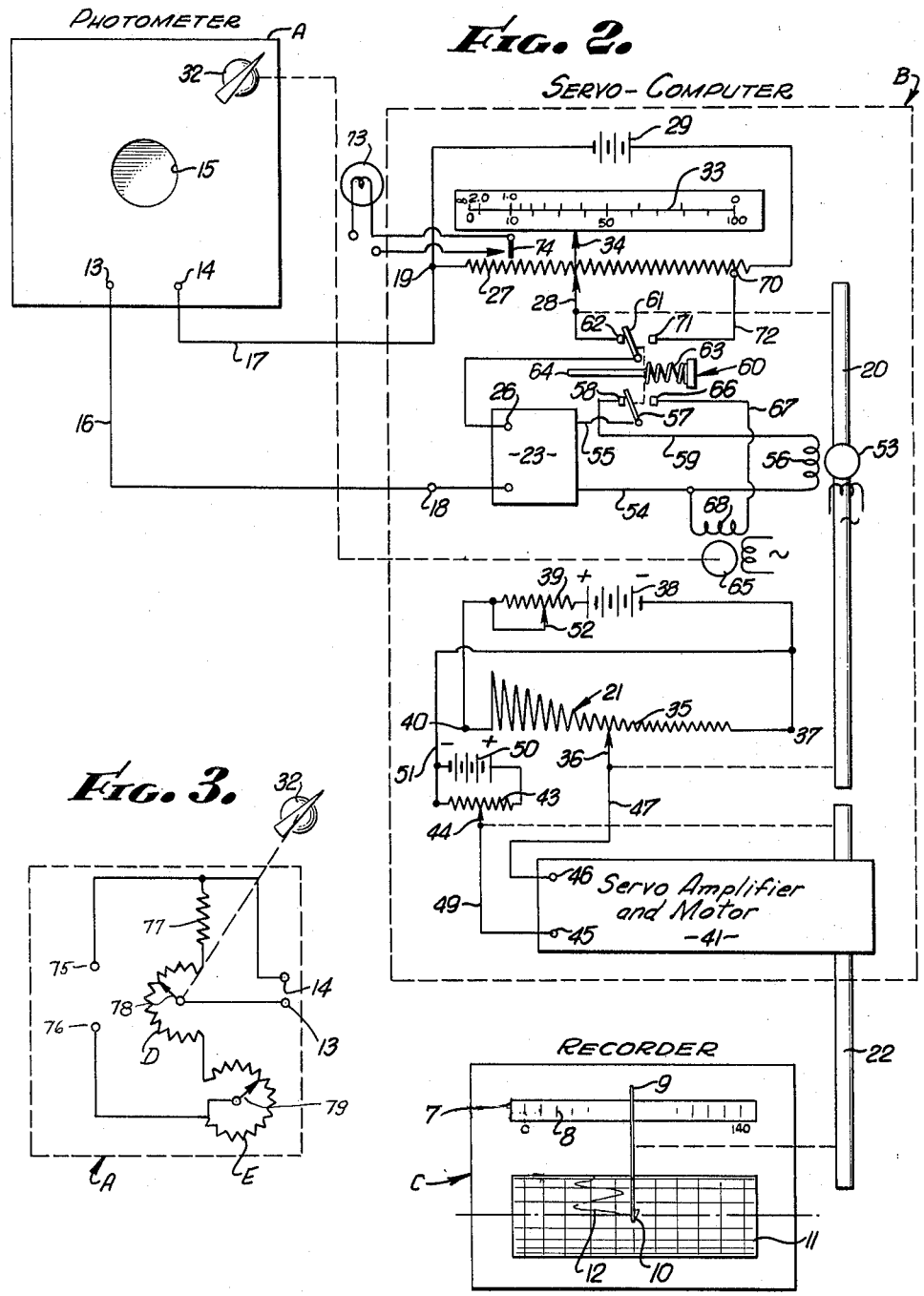

United States Patent Office

3,245,304
Patented Apr. 12, 1966

3,245,304
PHOTOMETRIC ANALYZER
John E. Davis, Garden Grove, Calif., assignor to Bio-Science Laboratories, Los Angeles, Calif., a corporation of California
Filed Aug. 14, 1961, Ser. No. 131,364
6 Claims. (Cl. 88—14)

This invention relates to apparatus for computing and recording photometric data.

A common problem in chemical analysis is to determine the concentration of certain solutes by the aid of light absorption tests. A photometer designed for this purpose can measure light transmited through a sample. The output of a well-designed photometer (which may be deflection of a galvanometer needle, or voltage across terminals) is linearly proportioned to transmitted light. Transmittance (T) is equal to $E/E_o$ where E is the voltage output when light is passed through the sample and $E_o$ is the voltage output when light is passed through the blank solution. By adjustment of excitation, the photometer can be made to read directly in transmittance. Thus with a blank or control solution inserted in the photometer the excitation is adjusted until the index or voltage corresponds to 1 or 100%.

It is a property of many solutes that the transmitted light decreases as the concentration of the solute increases. However, the relationship between concentration and transmitted light is logarithmic rather than linear. The following relationship thus pertains:

$$\text{Concentration } (C) = k(\log_{10} 1/T)$$

where $k$ is a characteristic constant of the solute. Log $1/T$ is known as absorbance (optical density).

In the past, an analysis of a series of test solutions involved slide rule calculations applied to readings of transmittance T or absorbance obtained from the photometer output. The chance of human error, of course, was substantial. The task of running a photometric test was tedious and time consuming.

Certain attempts have been made to devise apparatus for recording concentration directly by the application of servo system techniques to photometers. In one known device, absorbance is indicated on a linear rather than a logarithmic scale, but absorbance is not solute concentration. In order to convert absorbance into concentration, the characteristic constant $k$ must be applied.

The primary object of this invention is to provide an improved automatic apparatus for directly recording concentration (as distinguished from absorbance) on a linar scale. A corresponding object is to eliminate factors of human error in connection with photometric tests.

An object of this invention is to provide a device of this character in which the characteristic constant $k$ can be selected by one simple adjustment, resulting in direct reading of concentration on a linear scale.

My device directly converts transmittance into absorbance on a linear scale. After the 100% transmittance adjustment has been made, a standard solution of known concentration (in milligrams per hundred cubic centimeters) is inserted and adjustment made until the reading corresponds to the known concentration. The equipment is then set up for a test run, and no further adjustments need be made until a test for a different solute is performed.

Urine samples, for example, taken from different subjects or from the same subject taken at different times, may have different characteristic colors quite independent of the solute for which the test is made. It then becomes necessary to provide two solutions for each specimen, one for use in providing a blank solution and the other as the sample to be tested.

It thus becomes frequently necessary to adjust the photometer for a 100% transmittance. An object of this invention therefore is to provide equipment or apparatus for automatically accomplishing this adjustment in order to expedite this process. A circuit controller when operative accomplishes the requisite 100% transmittance adjustment. This circuit controller can be selectively operated by the technician or automatically operated in conjunction with programming apparatus.

In performing photometric chemical tests, it can usually be expected that samples will test within a given range. If the sample tests out of that range, there is large possibility of error either in the performance of the test or in the preparation of the sample solution. Accordingly, an object of this invention is to provide an indicator for alerting the technician to the fact that the apparatus has tested a sample which apparently falls outside the selected test range for the photometer.

Another object of this invention is to provide apparatus that can be used as auxiliary equipment interposed between a standard photometer and a standard recorder.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIG. 2 is a diagram similar to FIG. 1, illustrating a modified form of the present invention; and FIG. 3 is a diagram showing a portion of a photometer circuit for use in the present invention.

Figure 1:
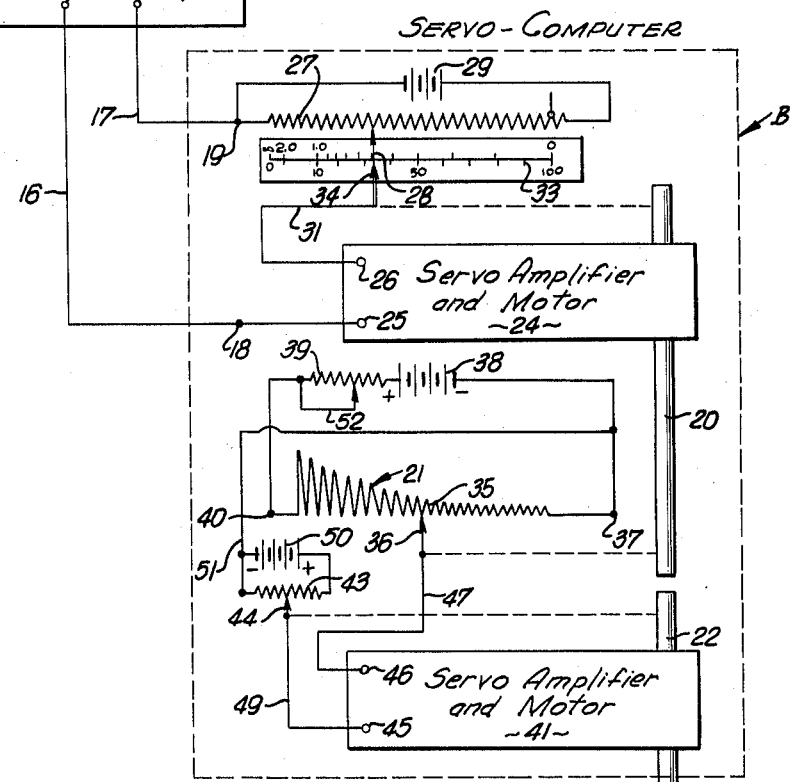
FIGURE 1 is a diagrammatic view illustrating a system incorporating the present invention.

In FIG. 1 there is illustrated a photometer A, a servo-computer B and a recorder C. The recorder C has a visual scale having linearly arranged markings 8 thereon. An indicator 9 cooperates with the scale 7 to read directly in concentration. A recording stylus 10 at one end of the indicator cooperates with a recording drum 11 and a chart 12 mounted thereon.

The photometer A may be any suitable standard photometer in which terminals 13 and 14 are accessible for deriving a voltage measurement that is linearly proportional to transmitted light. The photometer is indicated as having a suitable holder 15 for receiving a cuvette containing the sample, standard, or blank solution. The terminals 13 and 14, by the aid of leads 16 and 17, are connected to input terminals 18 and 19 of the servo-computer B.

The servo-computer B has a shaft or equivalent movable element 20 that is angularly or otherwise positioned as a linear function of transmittance (T) as measured by the voltage output of the photometer A, and in a manner to be described hereinafter. The shaft 20 drives a slider along a logarithmically wound potentiometer 21 so that there may be derived a voltage that satisfies the inverse logarithmic proportionality of absorbance. The servo-computer B furthermore has a shaft 22 that provides the mechanical analog of the output of the potentiometer 21, its displacement providing a measure of concentration. The proportionality constant $k$ is provided by adjustment of the excitation of the potentiometer 21 in a manner to be hereinafter described.

The shaft 22 positions the indicator 9 and the recording stylus 10 of the recorder C so that a direct reading of concentration is obtained. The manner in which all these functions are performed will now be described.

In order to position the shaft 20 in accordance with transmittance, a servo 24 is provided that includes an amplifier and a motor for driving the shaft 20. Servo 24 has an input indicated by terminals 25 and 26. The photometer output and a variable fraction of the voltage across a linearly wound potentiometer resistor 27 are differentially applied to the servo amplifier input terminals 25 and 26 to provide an error signal. The servo then operates in a well-known manner to adjust the slider 28 of the potentiometer until the servo input is corrected to zero error. The position of the slider 28 and the shaft 20 then measure transmitted light.

One of the terminals of the resistor 27 and the negative terminal 14 of the photometer are common to the input terminal 19 of the servo-computer B. These terminals may be regarded as the neutral or fulcrum point in the servo input circuit about which the compared inputs act.

A voltage source in this instance indicated by a battery 29 is appiled across the resistor 27. The source 29 may be another calibrated photometer A, preferably excited from the same light source so that the balance point is unaffected by extrinsic variables. In this case, the resistor 27 would be the usual shunt resistor forming a part of the photometer. The slider 28 taps off a positive voltage which is applied by a lead 31 to one servo input terminal 26. The positive output terminal 13 of the photometer A is applied to the other servo input terminal 25. The slider 28 is automatically adjusted to a null balance point by the servo output shaft 20, the connection being indicated by dotted lines.

In order that the positions of the slider 28 and shaft 20 correspond to transmittance (T) of a sample, the photometer A is first adjusted with a blank solution cuvette in the holder 15. A scale 33 and an indicator 34 coupled to the slider facilitate the adjustment. The lower side of the scale 33 has markings indicating percent transmittance from 0 to 100, and the upper side of the scale reads absorbance from infinity to zero. The markings on the absorbance scale are logarithmically spaced. A potentiometer knob 32 is adjusted until the indicator 34 falls at 100% scale mark with a blank solution in the holder 15. When samples of unknown characteristics are thereafter tested, the indicator 34 directly reads transmittance, and the shaft 20 is correspondingly positioned.

The potentiometer 21 now performs the second function, converting transmittance (T) to absorbance; namely, log $1/T$. The potentiometer 21 has a resistor 35 engaged by a slider 36, and the slider 36 is in turn positioned by the transmittance shaft 20 as indicated in dotted lines. The parts are so calibrated that the slider 36 is precisely at one end 37 of the resistor 35 when transmittance is 100%. This corresponds to 0 absorbance. As transmittance is reduced from 100%, the slider 36 moves away from end 37. The resistance included between the terminal 37 at the 0 absorbance end and the slider 36 is directly proportional to absorbance; namely, log $1/T$. Since the included resistance would have to be infinite at 0% transmittance, the resistor as a matter of practice, terminates short of this point. Thus the slider 36 reaches the end of the resistor 35 when absorbance is 2.0, which corresponds to 1% transmittance. Upon excitation of the resistor 35, as by source 38 (indicated as a battery) the voltage at tap 36 is directly proportioned to absorbance.

A potentiometer resistor 39 is serially associated with source 38, one of its terminals being common to one terminal of the source 38, and the other terminal being common to the terminal 40 of the logarithmic potentiometer 21 remote from 0 absorbance terminal 37. The other terminal of the source 38 is common to 0 absorbance terminal 37.

In order to provide an output that is linearly proportioned to absorbance, as measured by tap 36, a second servo 41 is provided, together with a measuring potentiometer resistor 43 and slider 44. The shaft 22 is positioned by the servo 41.

The servo 41 has input terminals 45 and 46 across which in differential arrangement, the voltage at slider 36 and a voltage at measuring slider 44 are applied to provide an error signal. Thus the slider 36 connects, by lead 47 to servo input terminal 46, and slider 44 connects, by lead 49 to servo input terminal 45. The 0 absorbance terminal 37 serves as the neutral or fulcrum point with respect to which the servo input components act. The slider 36 thus is positive relative to the neutral terminal 37 as determined by the polarity of exciting source 38. A source 50, indicated as a battery, is connected across the potentiometer resistor 43, the negative terminal being common to 0 absorbance terminal 37 by the aid of lead 51. Thus slider 44 also is positive relative to neutral terminal 37.

The difference in potential between the sliders 44 and 36 is applied in appropriate polarity relationship to the servo input terminals 45 and 46. The servo shaft 22 as indicated by dotted lines, moves the slider 44 in response to input signal until a null point is reached. The shaft position is then directly or linearly proportioned to absorbance.

In order to cause the indicator 9 to read directly in a specific contant $k$ times absorbance, that is, concentration, it is only necessary linearly to adjust the excitation of one of the input components to the servo 41. In the present example this is accomplished by an adjustable shunt 52 cooperable with series resistor 39 in the excitation circuit for the potentiometer 21.

Thus after the adjustment is achieved for 100% transmittance, a cuvette containing a solution of known concentration is inserted in a holder 15. The shunt 52 is then adjusted until the indicator 9 reads the known concentration of the standard. The apparatus is then conditioned for a test run. The recorder drum 11 is started and a series of cuvettes containing sample solutions are inserted in the holder 15.

The chart 12 and scale markings 8 preferably extend through a range adquate to allow selection of two or more points for calibration with a standard solution. Thus a 5 milligram per 100 cubic centimeter standard solution may be made to read 5 or 50 by adjustment. The potentiometer 52–39 thus has a substantial adjustment range relative to the logarithmic potentiometer 21 in order to provide substantial latitude for diverse standard solutions. Thus if the full scale input to servo 41 is one millivolt, the source 50 provides a corresponding output at slider 44. The potentiometer resistor 39 may then adjust output of slider 36 at full scale from 0.1 mv. to 10 mv.

The potentiometer resistor 21 is wound in accordance with the equation $R=k \log 1/(1-x)$ where $x$ is travel or distance from the 100% transmittance end, and R is the included resistance, $k$ being an appropriate range constant. This yields the requisite absorbance function.

In practice the resistor 21 can be a variable pitch helical coil, or it may be wound as a constant pitch coil with variable resistance wire. An acceptable arrangement is to provide a core tapered in accordance with the above equation, together with uniformly spaced circumscribing wire of uniform resistance characteristics.

A common supply may be used for sources 38 and 50 in order to eliminate errors due to extrinsic variables.

In the form illustrated in FIG. 2, the shaft 20 as before serves to position a slider 28 and an indicator 34 for denoting transmittance or absorbance. The shaft 20, as in the previous form, also cooperates with the slider 36 of the logarithmically wound potentiometer resistor 35. A servo amplifier 23 cooperates with a servo motor 53 for this purpose.

The servo amplifier 23 has output leads 54 and 55 that are connected to control winding 56 of the servo motor 53. One of the leads 54 directly connects to one side of the control winding 56, and the other lead 55 connects to the other side of the control winding 56 via a switch arm 57, a contact 58 and a lead 59. The switch arm 57 and the contact 58 are parts of a double pole, double throw switch 60, to be described presently hereinafter.

The input circuit to the servo amplifier 23 is similar to that of the previous form except that the terminal 26 connects to the slider 28 via a second switch arm 61 of the switch 60, and a contact 62 engaged thereby. A spring 63 normally positions the switch to establish the input and motor circuits just described.

When the switch 60 is moved to opposite contacting position, as by a plunger 64 (manually or otherwise operable) the other servo motor 65 is substituted in the circuit. The servo motor 65 directly or indirectly operates a slider (not shown), as indicated by the dotted lines, to bring the photometer A into adjustment so that a blank solution in the holder 15 reads 100% transmittance. The knob 32 which normally operates this slider may be deleted if desired.

With a blank solution in the holder 15, the switch 60 is moved. A contact 66 is engaged by switch arm 57, and the output lead 55 connects to one side of a control winding 68 for servo motor 65, a lead 67 being provided between the contact 66 and the winding 68. The other output lead 54 directly connects to the other side of the servo control winding 68. The servo motor 53 is furthermore disconnected.

The input applied to the servo amplifier 23 is, in this instance, the output of the photometer at terminals 13 and 14, and the voltage across the potentiometer resistor 27 from is 0% terminal 19 to 100% terminal 70. The switch arm 61 of the switch 60 thus engages a contact 71 which, by the aid of a lead 72, connects to the terminal 70. The voltage output of the photometer A at the terminals 13 and 14 is then adjusted with reference to the voltage at the terminal 70. Accordingly, the servo amplifier 23, operating in conjunction with the servo motor 65 and with a blank solution inserted in the holder 15, serves automatically to adjust the photometer for 100% transmittance readings.

Indicated in the form of FIG. 2, is an alarm 73 that may be either visual or audible. This alarm operates when the absorbance reaches a predetermined value, thereby signaling a possible error to the technician. For this purpose, a delicate switch arm 74 is engaged by the indicator 34 when the critical absorbance is indicated. This completes a circuit for the alarm 73. In practice, the switch arm 73 may be located so as to be closed when the indicator 34 enters the second log cycle at 1.0 absorbance.

In FIG. 3, there is illustrated diagrammatically a photometer capable of calibration so that for a given incident luminous flux on the photocell, the voltage output is constant.

A photoelectric device (not shown) connected to terminals 75 and 76 is shunted by two potentiometer resistors D and E and a resistor 77 all in series. The output from the photometer is taken across a slider 78 cooperating with resistor D and the terminal 75, indicated by output terminals 13 and 14. The slider 78 is adjusted by knob 32.

A slider 79 cooperates with resistor E to vary the combined resistance value of the shunt so that, with the slider 78 at the end of the resistor D electrically remote from terminal 14, the output voltage is fixed at a reference value. This results in a given standard solution producing identical readings on each photometer so calibrated. Data for one test run can then be taken with different photometers. In the event of breakdown of one photometer, for example, the data obtained to the point of breakdown can be used without added calculations.

The photometer A of FIG. 3 can be used as a reference in the systems of FIGS. 1 and 2 by connecting terminal 14 of photometer A to input terminal 19 of servo-computer B, and by using the resistor 27 in place of the resistors D and 77.

The inventor claims:

1. In apparatus for determining the radiation absorption characteristics of sample: a servomechanism having an output member for positioning an indicator, and having an input; first circuit means having a movable element and providing a signal the magnitude of which is a first proportionality constant multiplied by the position of said element; second circuit means having a movable element and providing a signal the magnitude of which is a second proportionality constant multiplied by $\log 1/1-x$ where $x$ is the position of its movable element; means for applying the signals in differential arrangement to the input of the servomechanism; means coupling the movable element of the first circuit means to the output member in negative feedback relationship; means positioning the movable element of the second circuit means in direct proportion to the transmittance of said sample; and means connected to one of said circuit means for relatively adjusting the proportionality constants of the circuit means.

2. In apparatus for determining the radiation absorption characteristics of a sample: a servomechanism having an output shaft for positioning an indicator, and having an input; a potentiometer having a slider for providing a signal the magnitude of which is a first proportionality constant multiplied by the position of said slider; a second potentiometer having a slider providing a signal the magnitude of which is a second proportionality constant multiplied by $\log 1/1-x$ where $x$ is the position of the slider; means for applying the signals in differential arrangement to the input of the servomechanism; adjustable circuit means connected to one of the potentiometers determining the relative excitation of the potentiometers to vary the relative effect of the corresponding signals; a connection between the output shaft and the slider of the first potentiometer and effective to reduce the difference between the signals; a shaft movable in direct proportion to the transmittance of said sample for positioning the slider of the second potentiometer.

3. In apparatus for determining the radiation absorption characteristics of a sample: a first servomechanism having a shaft and an input; a transmittance scale; an indicator operated by the shaft and cooperable with the scale; a measuring device providing a first signal which is a first proportionality constant multiplied by intensity of light; said device having means adjustable to vary said first proportionality constant; means coupled to said shaft for providing a second signal which is a second proportionality constant multiplied by the position of said shaft; means differentially applying said first and second signals to said servomechanism input for moving the shaft to reduce to zero the difference between said signals; operation of said adjustable means enabling the indicator to be positioned at 100% transmittance when light passing a blank solution is measured; circuit means having a movable element positioned by said shaft for providing an electrical signal which is a third proportionality constant multiplied by absorbance of said sample; and means connected to one of said circuit means for adjusting the proportionality constant of said one circuit means whereby an electrical signal corresponding to concentration is provided.

4. In apparatus for determining the radiation absorption characteristics of a sample: a first servomechanism having a shaft and an input; a transmittance scale; an indicator operated by the shaft and cooperable with the scale; a measuring device providing a first signal which is a first proportionality constant multiplied by intensity of light; said device having means adjustable to vary said first proportionality constant; means coupled to said shaft for providing a second signal which is a second proportionality constant multiplied by the position of said shaft; means differentially applying said first and second signals to said servomechanism input for moving the shaft to reduce to zero the difference between said signals; operation of said adjustable means enabling the indicator to be positioned at 100% transmittance when light passing a blank solution is measured; circuit means having a movable element positioned by said shaft for providing an electrical signal which is a third proportionality constant multiplied by absorbance of said sample; a concentration scale; an indicator movable along said concentration scale in accordance with said electrical signal; and means connected to one of said circuit means for adjusting the proportionality constant of said one circuit means whereby said indicator directly reads concentration along said concentration scale.

5. The combination as set forth in claim 4 in which said circuit means comprises a potentiometer having a slider positioned by said shaft and an adjustable excitation means therefor; said potentiometer being so wound that the voltage at said slider is directly proportional to $\log 1/1-x$ where $x$ is the position of the slider from that corresponding to 100% transmittance; said adjustable excitation means serving to vary the proportionality constant for providing a direct reading of concentration.

6. In apparatus for determining the radiation absorption characteristics of a test sample by the aid of a reference sample: photosensitive means providing an output voltage which is a first proportionality constant multiplied by transmitted light, and including an element for varying the said proportionality constant; a linear potentiometer resistor; a movable slider cooperable with said potentiometer resistor; means for applying an electrical potential across said resistor; a first servomechanism in which the output voltage of said photo-sensitive means is the reference standard and the voltage at said slider by virtue of its position is the controlled variable whereby the slider provides a linear measure of transmittance of said test sample; a second servomechanism in which the voltage of a fixed point of said resistor is the reference standard and the position of said element of said photo-sensitive means, is the controlled variable whereby the slider is calibrated by said reference sample; and switch means for alternately operating said servomechanisms.

References Cited by the Examiner

UNITED STATES PATENTS

| | | | |
|---|---|---|---|
| 2,462,995 | 3/1949 | Ritzmann | 346—330 |
| 2,755,704 | 7/1956 | Gilbert | 88—23 |
| 2,960,910 | 11/1960 | Pelavin | 88—14 |
| 3,027,552 | 3/1962 | Landis | 88—14 |

JEWELL H. PEDERSEN, *Primary Examiner.*